Patented Feb. 1, 1949

2,460,708

UNITED STATES PATENT OFFICE 2,460,708

PROCESS FOR MAKING ACETAMIDO DIMETHYLACRYLIC ACID

Ralph Mozingo, Elizabeth, and Karl Folkers, Plainfield, N. J., assignors to Merck & Co., Inc., Rahway, N. J., a corporation of New Jersey No Drawing. Application March 22, 1946, Serial No. 656,510

1 Claim. (Cl. 260—534)

This invention is concerned generally with novel chemical compounds and processes for preparing the same; more particularly it relates to esters of α-acylamido-β,β-dimethyl-acrylic acid, useful in the preparation of penicillamine, a primary intermediate in the synthesis of penicillin, and to processes for preparing such compounds. Penicillamine has been prepared from penicillin by hydrolyzing a salt of penicillin with hot dilute mineral acid (Nature 151, 107 (1943)). It has been determined that the product thus obtained is an α-amino acid of the d or "unnatural" series having a structure fully defined by the chemical names d-α-amino-β-mercaptoisovaleric acid or d-β,β-dimethyl cysteine.

It is now discovered, in accordance with the present invention that α-acylamido-β,β-dimethyl acrylic esters can be synthesized by reactions indicated as follows:

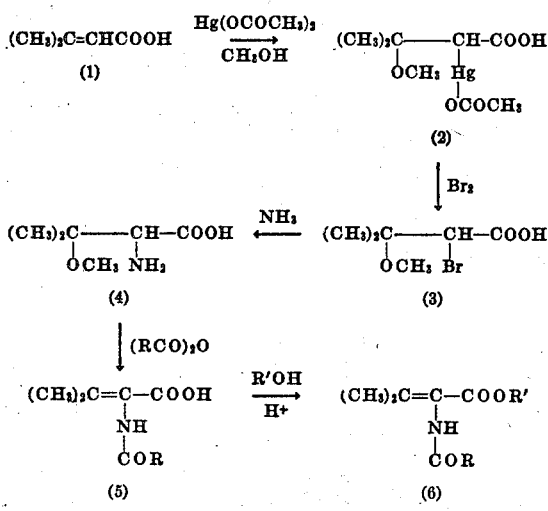

wherein R is an alkyl, aryl or aralkyl radical and R' is an alkyl or aralkyl radical.

The reactions indicated above are conducted as follows: Dimethylacrylic acid (1) is reacted with mercuric acetate in methanol and the mercuric acetate addition compound (2) thus obtained is brominated in aqueous potassium bromide solution to produce α-bromo-β-methoxyisovaleric acid (3); the bromo derivative is then treated with aqueous ammonium hydroxide whereby the bromo radical is converted to an amino group; the α-amino-β-methoxyisovaleric acid is then reacted with an acyl anhydride to form α-acylamido-β,β-dimethylacrylic acid (5) which can be converted to its ester by reaction with an alkyl or aralkyl alcohol. This α-acylamido-β,β-dimethylacrylic ester (6) can be converted to dl-penicillamine by reaction with hydrogen sulfide, preferably in the presence of an alcoholate of an alkali metal or alkaline earth metal, as described in detail in a co-pending joint application by Sheehan, Mozingo, Folkers and Tishler, Serial No. 656,512, filed March 22, 1946.

The starting material, dimethylacrylic acid, which can be prepared as described in Organic Syntheses, volume 23, page 27 (1943), is reacted with an equimolecular quantity of mercuric acetate, preferably in solution in a lower aliphatic alcohol such as methanol, to produce the mercuric acetate addition compound. If the quantities of reagents are suitably chosen, the product crystallizes directly from the reaction mixture and can be recovered therefrom by filtration. This addition compound is dissolved in water containing an alkali metal bromide, such as potassium bromide, and bromine is added portionwise to the solution in the presence of sunlight or strong artificial light until a slight excess of bromine exists in the solution. The solution is then treated with a reducing agent such as sodium bisulfite, sodium sulfite, and the like, to destroy excess bromine present and the reaction mixture is then made strongly acid by the addition of a concentrated mineral acid. The acidified reaction mixture is then extracted with chloroform and the chloroform extract evaporated to yield α-bromo-β-methoxyisovaleric acid. This product is then treated with an ammonolyzing agent, for example, concentrated ammonium hydroxide under pressure whereby the bromo radical is replaced by the amino group. The product is recovered from the solution by evaporation followed by fractional crystallization and the product purified by recrystallization from water or mixtures of water and organic solvent, such as acetone to produce pure α-amino-β-methoxyisovaleric acid.

The α-amino-β-methoxyisovaleric acid is converted to the desired α-acetyl-amino-β,β-dimethylacrylic acid by reaction with a mixture of an alkali metal salt of aliphatic organic acid such as sodium acetate, potassium propionate and the like, and an organic acid anhydride, such as acetic anhydride, propionic anhydride and the like. The reaction is conveniently carried out in an aqueous solution at room temperature or preferably at temperatures in the neighborhood of 50–100° C. The product is recovered from the resulting aqueous reaction solution by concentration to dryness and extracting and acidifying the dry residue with concentrated hydrochloric acid. This mixture can then be dissolved in the minimum quantity of water, and the α-acetylamino-β,β-dimethylacrylic acid extracted from the aqueous solution with chloroform. Alternatively, the concentrated hydrochloric acid slurry can be filtered and the product insoluble therein dissolved in hot acetone, filtered to remove undissolved sodium chloride and cooled whereupon the α-acetylamino-β,β-dimethylacrylic acid crystallizes. The crude material obtained by either of the above processes can be further purified by recrystallization from acetone or other lower aliphatic ketone.

The following examples illustrate methods of carrying out the presently invented process, but it is to be understood that these examples are given by way of illustration and not of limitation.

Example 1

About 353 g. of reagent mercuric oxide and about 196 g. of glacial acetic acid are dissolved in about 2 liters of methanol and the mixture warmed on the steam bath for approximately 5 minutes whereupon most of the mercuric oxide dissolves. About 163 g. of β,β-dimethylacrylic acid dissolved in about 465 cc. of methanol is added thereto with good agitation. The mixture is stirred whereupon any undissolved mercuric oxide dissolves and within 5 or 10 minutes white crystals of the mercuric acetate addition compound begin to form. The reaction solution is allowed to stand at room temperature for approximately 16 hours with occasional stirring, during which time substantially all of the product crystallizes, and is recovered by filtration and purified by washing with about 200 cc. of methanol. The product is air dried at room temperature to produce approximately 385 g. of substantially colorless product.

The mercuric acetate addition compound prepared above (weight about 385 g.) is added to a solution of about 292 g. of potassium bromide dissolved in about 1600 cc. of water. The resulting solution is stirred in an open beaker in the light from two #2 photoflood lamps fitted with reflectors, and a solution of about 259 g. of bromine and about 292 g. of potassium bromide in about 486 cc. of water is added thereto with cooling over a period of approximately 50 or 60 minutes. The addition of the bromine solution is continued until a persistence of the bromine color in the reaction mixture and increase of color when more bromine is added indicating the end of the reaction, at which time the addition is stopped. The reaction mixture is stirred for an additional 10-15 minutes, excess bromine is destroyed with sodium bisulfite, and the reaction mixture is made strongly acid with about 100 cc. of concentrated hydrobromic acid. The acidified solution is then extracted with ten 200 cc. portions of chloroform. The chloroform extract is dried over anhydrous sodium sulfate and concentrated under reduced pressure on the steam bath to produce about 155 g. of crude α-bromo-β-methoxyisovaleric acid.

About 80 g. of crude α-bromo-β-methoxyisovaleric acid is heated under pressure for approximately six hours at about 90–100° C. with about 800 cc. of concentrated ammonium hydroxide. The ammoniacal solution is concentrated under reduced pressure on the steam bath until the product commences to crystallize. The solution is cooled and a first crop of crude product is filtered and the mother liquor is concentrated to recover additional material. The crude amino acid is purified by recrystallization from boiling water to produce pure α-amino-β-methoxyisovaleric acid; M. P. 265° C. dec.

About 24 g. of α-amino-β-methoxyisovaleric acid, about 47 g. of anhydrous sodium acetate and about 200 cc. of reagent acetic anhydride is dissolved in about 500 cc. of water and the solution warmed on the steam bath for approximately 20 minutes. The solution is evaporated to dryness under reduced pressure on the steam bath and the dried product slurried with about 44 cc. of concentrated hydrochloric acid. The residual material insoluble in the concentrated hydrochloric acid is dissolved in hot acetone, the slurry filtered to remove insoluble sodium chloride, and the filtrate cooled, whereupon substantially pure α-acetylamino-β,β-dimethylacrylic acid crystallizes and is recovered by filtration and dried; M. P. 200–201° C. dec.

The α-acetylamino-β,β-dimethylacrylic acid can be isolated by an alternative method. After concentration of the reaction mixture, about 44 cc. of concentrated hydrochloric acid is added as described above together with sufficient water to make a solution. This strongly acidic solution is then continually extracted with chloroform, and the chloroform extract evaporated to produce crude α-acetylamino-β,β-dimethylacrylic acid which is purified by recrystallization from acetone as described in the preceding paragraph.

Example 2

About 60 g. of mercuric oxide, about 28 g. of β,β-dimethylacrylic acid, about 417 cc. of methanol, about 33 g. of glacial acetic acid are heated on a steam bath for about 5 minutes and the reaction mixture cooled to about 0–5° C. The solid mercuric acetate addition compound which separates is recovered by filtration and is then dissolved in a solution containing about 45 g. of potassium bromide in about 250 cc. of water. Two No. 2 photo-flood lamps are placed above the solution which is contained in a beaker immersed in an ice bath, and a solution containing about 45 g. potassium bromide and about 40 g. of bromine in about 250 cc. of water is added to the solution of mercuric acetate addition compound over a period of approximately 20 minutes. The reaction mixture is stirred for an additional 30 minutes, the excess bromine reduced by adding sodium bisulfite to the reaction solution, and about 5 cc. of concentrated hydrobromic acid is added thereto. The reaction mixture is then extracted with chloroform, and the chloroform extract evaporated to dryness to produce crude α-bromo-β-methoxyisovaleric acid. The entire yield of crude bromo acid is dissolved in about 30 cc. of concentrated ammonium hydroxide and the ammoniacal solution heated under pressure for approximately six hours at about 90–100° C. The reaction solution is evaporated to small volume and the crystals of crude amino acid which separate are recovered by filtration. The crude product is recrystallized from a water methanol mixture to produce about 3 g. of pure α-amino-β-methoxyisovaleric acid; M. P. 265° C. dec.

About 1 g. of α-amino-β-methoxyisovaleric acid is added to a solution containing about 2 g. of sodium acetate in about 50 cc. of water, and about 5 cc. of acetic anhydride is added thereto. The mixture is allowed to stand at room temperature approximately 20 minutes and then heated on a steam bath. Approximately 3 cc. additional acetic anhydride is added and heating continued for approximately 20 minutes additional time. The resulting solution is concentrated to dryness and the residue dissolved in a small amount of water and acidified with concentrated hydrochloric acid. The aqueous acid solution is extracted continuously with chloroform and the extract evaporated to dryness. The residue is recrystallized from acetone to produce substantially pure α-acetyl-amino-β,β-dimethylacrylic acid; M. P. 198–200° C. dec.

*Example 3*

The methyl ester of α-acetylamino-β,β-dimethylacrylic acid is prepared as follows:

About 14 g. of α-acetylamino-β,β-dimethylacrylic acid is dissolved in about 200 cc. of methanol and the solution substantially saturated with hydrogen bromide gas and allowed to stand for approximately one hour. Substantially all of the methanol and hydrogen bromide is evaporated from this solution to produce an oil which is dissolved in approximately 100 cc. of fresh methanol and methyl alcoholic potassium hydroxide is added to the resulting solution to a pH of about 6. The potassium bromide is removed by filtration and the methanol is evaporated from the resulting solution. The residue is then extracted with ether and the ether extract evaporated to produce about 8 g. of colorless needles which are purified by recrystallization from ether to produce pure methyl-α-acetylamino-β,β-dimethyl acrylate; M. P. 90–91° C.

Other esters of α-acetylamino-β,β-dimethylacrylic acid can be prepared in the same manner as described above employing other lower aliphatic alcohols as for example, ethyl alcohol, propyl alcohol, isopropyl alcohol, butyl alcohol and the like. Other mineral acid catalysts can be employed in place of the hydrogen bromide catalyst such as, hydrogen chloride and the like.

Modifications may be made in carrying out the present invention without departing from the spirit and scope thereof and the invention is to be limited only by the appended claim.

We claim:

The process which comprises reacting α-amino-β-methoxyisovaleric acid with a mixture comprising aqueous sodium acetate and acetic anhydride to produce α-acetamido-β,β-dimethylacrylic acid.

RALPH MOZINGO.
KARL FOLKERS.

REFERENCES CITED

The following references are of record in the file of this patent:

Bouveault et al., "Comptes Rendus Acad. Sci.," vol. 131 (1900), page 1213.

Schrauth et al., "Ber. Deut. Chem. Ges.," vol. 55, pages 2788–2790.

Aberhalden, "Chemical Abstracts," vol. 21 (1927), page 1966, abstract of "Z. Physiol. Chem.," vol. 163, pages 261–266 (1927).

Aberhalden et al., "Ber. Deut. Chem. Ges.," vol. 67 (1934), pages 534, 535, 541 and 542.

Prokofiev et al., "Chemical Abstracts," vol. 34 (1940), page 4056, abstract of "Comptes Rendus Acad. Sci. U. S. S. R." (1939), pages 488–492.

Carter et al., "Organic Syntheses," vol. 20 (1940), pages 101–103.

Carter et al., "J. Biol. Chem.," vol. 133 (1940), pages 118, 119.

Carter et al., "J. Biol. Chem.," vol. 139 (1941), page 250.